US010313546B2

(12) United States Patent
Watanabe et al.

(10) Patent No.: US 10,313,546 B2
(45) Date of Patent: Jun. 4, 2019

(54) IMAGE READING APPARATUS AND IMAGE FORMING APPARATUS

(71) Applicant: Konica Minolta, Inc., Chiyoda-ku, Tokyo (JP)

(72) Inventors: Takashi Watanabe, Toyokawa (JP); Kazutoshi Yoshimura, Tokokawa (JP); Kiyohito Tsujihara, Toyokawa (JP); Akinori Kimata, Toyokawa (JP); Shiro Umeda, Toyokawa (JP); Kouei Cho, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/717,979

(22) Filed: Sep. 28, 2017

(65) Prior Publication Data

US 2018/0109693 A1    Apr. 19, 2018

(30) Foreign Application Priority Data

Oct. 19, 2016    (JP) .................................. 2016-205157

(51) Int. Cl.
*H04N 1/04* (2006.01)
*H04N 1/00* (2006.01)

(52) U.S. Cl.
CPC ....... *H04N 1/00909* (2013.01); *H04N 1/0071* (2013.01); *H04N 1/00588* (2013.01); *H04N 1/00641* (2013.01); *H04N 1/00748* (2013.01)

(58) Field of Classification Search
CPC ........... H04N 1/00909; H04N 1/00588; H04N 1/00641; H04N 1/0071; H04N 1/00748; H04N 1/193; H04N 1/12; H04N 1/00602; H04N 1/0057; H04N 1/121

USPC .................. 358/498, 496, 486, 408, 461
See application file for complete search history.

(56) References Cited

U.S. PATENT DOCUMENTS

| 4,996,604 A * | 2/1991 | Ogawa ............... H04N 1/00594 358/474 |
| 7,859,728 B2 * | 12/2010 | Yun ....................... G03G 15/23 358/474 |
| 8,085,448 B2 * | 12/2011 | Kato .................. H04N 1/00909 358/472 |

(Continued)

FOREIGN PATENT DOCUMENTS

JP    2011-010050    1/2011

*Primary Examiner* — Cheukfan Lee
(74) *Attorney, Agent, or Firm* — Buchanan Ingersoll & Rooney PC

(57) ABSTRACT

An image reading apparatus for separating and conveying documents from a bundle of documents, causing the document to pass through a reading position, and reading an image from the document, includes: a reading translucent plate; a rotation member capable of rotating around a shaft; and a rotation driver that rotates the rotation member, wherein in the rotation member, each of: a cleaning member; a white reference area; and an end portion detection area is formed partially with regard to a circumferential direction, the cleaning member and the end portion detection area are arranged adjacent to each other, the rotation driver is arranged so that the end portion detection area faces an opposing surface, and the rotation member is rotated in a paper interval period from when a trailing edge of the document passes the reading position to when a leading edge of a subsequent document reaches the reading position.

10 Claims, 15 Drawing Sheets

(56) References Cited

U.S. PATENT DOCUMENTS

| | | | |
|---|---|---|---|
| 8,208,182 B2* | 6/2012 | Han | H04N 1/2032 358/408 |
| 9,036,225 B2* | 5/2015 | Ikeda | H04N 1/00909 358/474 |
| 9,456,103 B2* | 9/2016 | Mitamura | H04N 1/00649 |
| 2002/0039208 A1* | 4/2002 | Honjo | H04N 1/00909 358/514 |
| 2002/0101625 A1* | 8/2002 | Shouji | H04N 1/00909 358/474 |
| 2003/0072041 A1* | 4/2003 | Sawada | H04N 1/00578 358/494 |
| 2008/0239416 A1* | 10/2008 | Kato | H04N 1/00909 358/498 |
| 2010/0085616 A1* | 4/2010 | Shinno | H04N 1/00909 358/498 |
| 2011/0102865 A1* | 5/2011 | Ishida | B08B 1/007 358/498 |
| 2011/0164290 A1* | 7/2011 | Nishikawa | H04N 1/00909 358/461 |
| 2011/0181922 A1* | 7/2011 | Tanimoto | H04N 1/00543 358/474 |
| 2011/0199653 A1* | 8/2011 | Nishikawa | H04N 1/00909 358/483 |
| 2013/0293935 A1* | 11/2013 | Shinno | H04N 1/10 358/496 |

* cited by examiner

FIG. 7
READ IMAGE
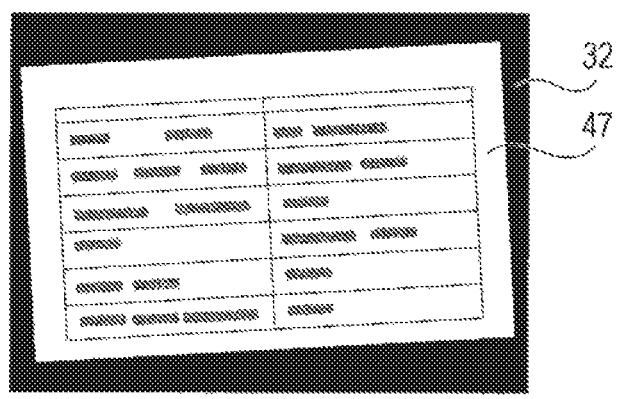
CROP, CALCULATE INCLINATION, AND CALCULATE DEVIATION
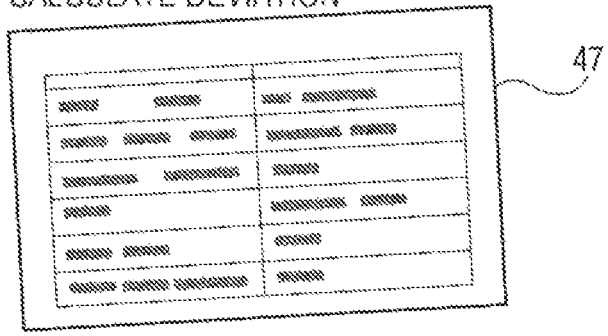
CORRECTED IMAGE
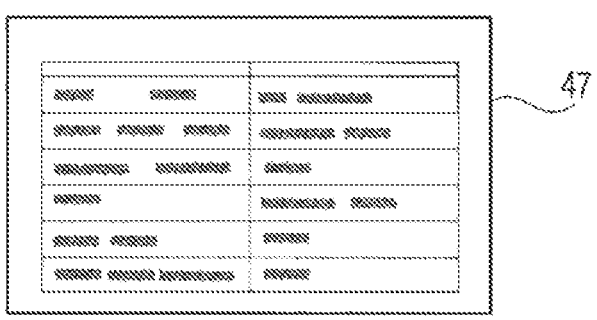

IMAGE READING APPARATUS AND IMAGE FORMING APPARATUS

Japanese Patent Application No. 2016-205157 filed on Oct. 19, 2016, including description, claims, drawings, and abstract the entire disclosure is incorporated herein by reference in its entirety.

BACKGROUND

Technological Field

The present invention relates to an image reading apparatus for separating and conveying documents one by one from a bundle of sheet-like documents, and reading images from these documents. Furthermore, the present invention relates to an image forming apparatus equipped with the image reading apparatus.

Description of the Related art

Examples of a conventional image reading apparatus and a conventional image forming apparatus include those described in JP 2011-010050 A. In the apparatus of JP 2011-010050 A, documents separated one by one are conveyed by a "reading entrance roller 16" and a "reading exit roller 23". The document passes over a "translucent member 21" while the document is conveyed, and the image is read at that time (paragraphs [0034] to [0036], FIG. 4 of JP 2011-010050 A). JP 2011-010050 A further includes "cleaning means 301". The "cleaning means 301" is provided with a "cleaning member 305", a "white plate 303", and a "black plate 304" (paragraph [0058] of JP 2011-010050 A). The "cleaning member 305" cleans the upper surface of "translucent member 21". The "white plate 303" and the "black plate 304" are provided to detect foreign materials.

However, the above-described conventional technique has a problem in that the reading speed cannot be increased to a sufficiently high speed. In the apparatus of JP 2011-010050A, it is necessary to completely retract the "cleaning means 301" from the reading position when the document to be read passes the reading position. From this state, between a gap between documents (between sheets), it is necessary to bring the "black plate 304" of the "cleaning means 301" to the reading position and retract the "black plate 304" of the "cleaning means 301" back to the original position again. Therefore, it is impossible to shorten the space between the documents to a narrow distance. It may also possible to use the "black plate 304" to detect the end portions in the width direction of the reading document, but it is actually impossible to do so. This is because the document is not configured to pass between the "black plate 304" and the "translucent member 21".

SUMMARY

The present invention has been made in order to solve the problem of the above-described conventional technique. More specifically, it is an object of the present invention to provide an image reading apparatus capable of cleaning a reading position between sheets in a short period of time while detecting the end portions in the width direction of a document to be read, and to provide an image forming apparatus having the image reading apparatus.

To achieve the abovementioned object, according to an aspect of the present invention, there is provided an image reading apparatus for separating and conveying documents one by one from a bundle of documents, causing the document to pass through a reading position, and reading an image from the document, and the image reading apparatus reflecting one aspect of the present invention comprises: a reading translucent plate of which width direction includes a portion formed to be longer in a direction crossing a conveying direction of documents; a rotation member capable of rotating around a shaft and provided in a width direction to face an opposing surface which is opposed to the document on the reading translucent plate; and a rotation driver that rotates the rotation member, wherein in the rotation member, each of: a cleaning member that comes into contact with the opposing surface according to rotation of the rotation member; a white reference area for obtaining white reference of the image to be read; and an end portion detection area for detecting a width direction end portion of a document is formed partially with regard to a circumferential direction, the cleaning member and the end portion detection area are arranged adjacent to each other without the white reference area interposed therebetween with regard to the circumferential direction of the rotation member, the rotation driver is arranged so that the end portion detection area faces the opposing surface while the document is passing through the reading position, and the rotation member is rotated in a paper interval period from when a trailing edge of the document passes the reading position to when a leading edge of a subsequent document reaches the reading position, so that the cleaning member is once brought into contact with the opposing surface, and then the end portion detection area returns back to a state of facing the opposing surface.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a schematic diagram for explaining end portion correction with the document end portion detection function;

DETAILED DESCRIPTION OF EMBODIMENTS

Figure 1:
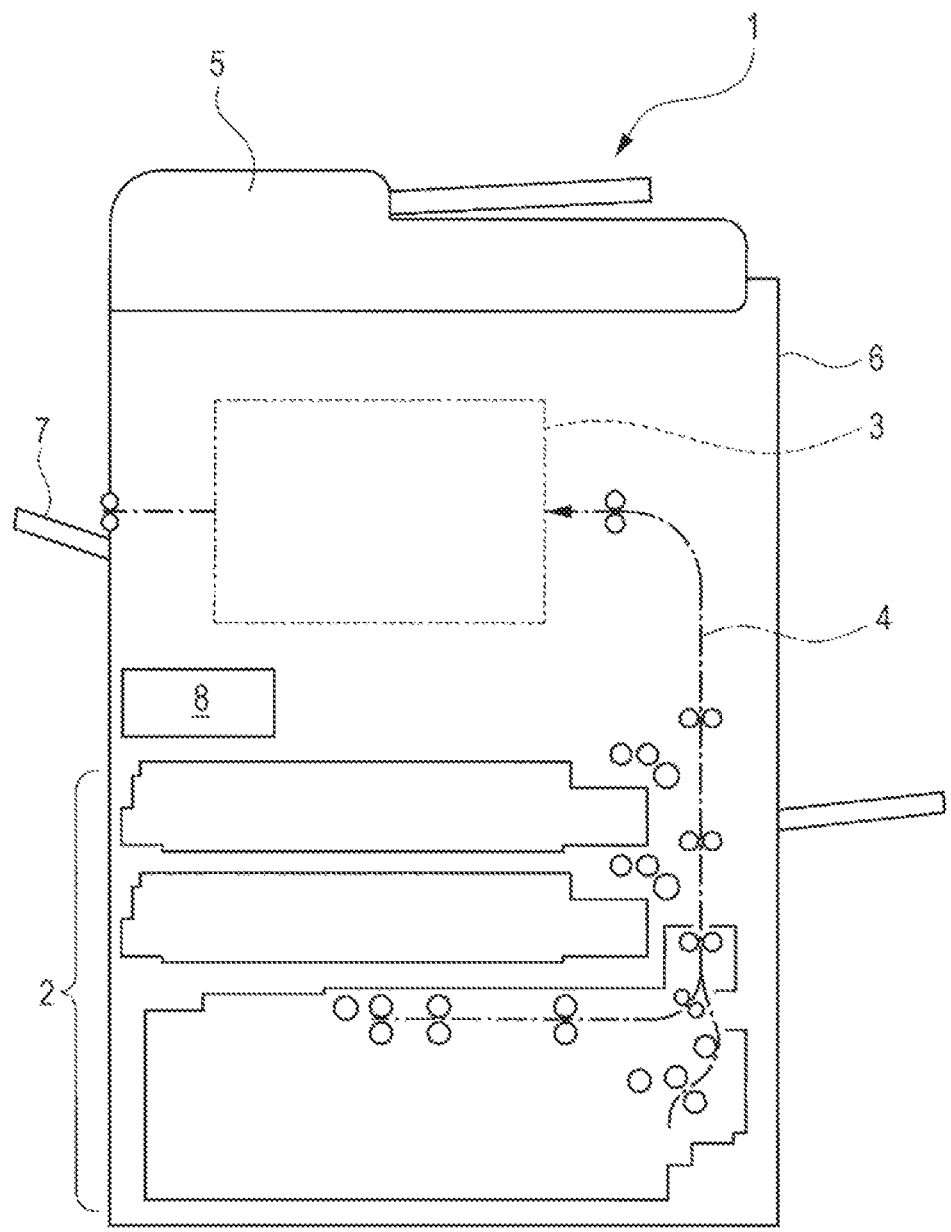
FIG. 1 is an overall configuration diagram illustrating an image forming apparatus according to an embodiment.

Hereinafter, one or more embodiments of the present invention will be described in detail with reference to the drawings. However, the scope of the invention is not limited to the disclosed embodiments. This embodiment is obtained by applying the present invention to the image forming apparatus 1 shown in FIG. 1. In terms of appearance, the image forming apparatus 1 in FIG. 1 is composed of a main body unit 6 and a scanner unit 5 provided thereon. The main body unit 6 includes a sheet supply unit 2 for supplying a printing sheet (recording medium) and a process unit 3 for performing image forming, and the main body unit 6 serves as a main part in terms of the appearance of the image forming apparatus 1. The process unit 3 is an image former as shown in FIG. 1 of JP 2013-130628 A, for example. In addition, the main body unit 6 is also provided with a sheet discharge tray 7. Furthermore, the main body unit 6 is also provided with a control unit 8 and a sheet supply path 4. The scanner unit 5 reads an image from a document and outputs its image data. More specifically, the image forming apparatus 1 is a copying machine that copies the image on the document.

Figure 2:
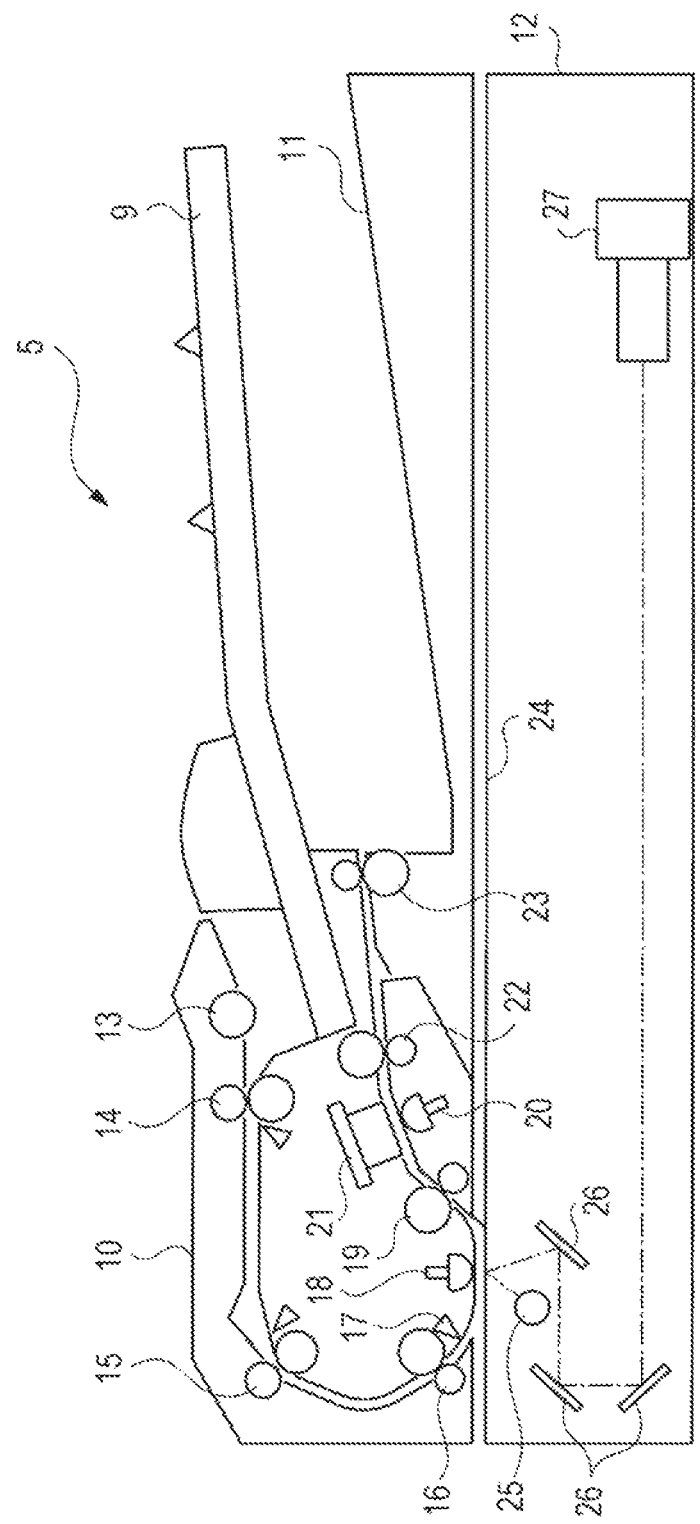
FIG. 2 is a cross-sectional view illustrating a configuration of a scanner unit in the image forming apparatus of FIG. 1.

FIG. 2 illustrates the internal structure of the scanner unit 5. The scanner unit 5 includes a document tray 9, an automatic conveying mechanism 10, a document discharge tray 11, and a scanner 12. The automatic conveying mechanism 10 includes a pick roller 13, a feeding roller 14, a resistance roller 15, a first reading roller 16, a pre-reading sensor 17, a first cleaning device 18, a second reading roller 19, a second cleaning device 20, a back surface reading device 21, a third reading roller 22, and discharge roller 23. The scanner 12 includes a platen glass 24, an exposure lamp 25, a mirror group 26, and a front surface reading device 27.

First, the scanner 12 will be briefly described. The exposure lamp 25 and the mirror group 26 provided in the scanner 12 are configured to be movable for so-called manual feed scanning. However, since the distinctive feature of the present embodiment resides in the automatic feed scanning rather than the manual feed scanning, the movement of the exposure lamp 25 and the mirror group 26 will not be explained. The position shown in FIG. 2 of exposure lamp 25 and the mirror group 26 are at a fixed position during automatic feed scanning. At this position, the illumination position of the light to the platen glass 24 by the exposure lamp 25 is a portion which is downstream of the first reading roller 16 and upstream of the second reading roller 19 in the automatic conveying mechanism 10, and which has such a shape that its longer side is in a direction crossing the conveying direction of documents (i.e., a width direction). This position is the reading position for the image on the front surface of the document (the surface facing upward on the document tray 9). Needless to say, the light emitted from the exposure lamp 25 and reflected by the front surface of the document is guided by the mirror group 26 to the front surface reading device 27 which is a light receiver.

Subsequently, the automatic conveying mechanism 10 will be described. The first cleaning device 18 of the automatic conveying mechanism 10 is provided so as to face the upper surface of the platen glass 24 of the scanner 12, i.e., the opposing surface opposed to the document. The position is, of course, the position facing the reading position of the above front surface. The first cleaning device 18 is a rotation member which is longer in the width direction of the document (direction perpendicular to the paper surface of FIG. 2). The details will be explained later in FIG. 3. Although not described in details, the back surface reading device 21 is provided with a light emitting device similar to the exposure lamp 25 and a light receiving device similar to the front surface reading device 27. Therefore, the image of the back surface of the document is read. Accordingly, the position of the back surface reading device 21 is the reading position of the back surface. It should be noted that a translucent plate similar to the platen glass 24 having such a shape that its longer side is in the width direction is arranged on the front surface of the back surface reading device 21, i.e., the surface facing the document. The second cleaning device 20 is similar to the first cleaning device 18.

In such an automatic conveying mechanism 10, the uppermost document of the bundle of documents placed on the document tray 9 is picked up by the pick roller 13, and is separated and fed one by one by the feeding roller 14. The fed document is temporarily stopped by the resistance roller 15 so that the skew is corrected and then the document is conveyed toward the reading position. The document fed by the resistance roller 15 is further conveyed by the first reading roller 16, the second reading roller 19, and the third reading roller 22. Meanwhile, image reading is performed with the front surface reading device 27 and the back surface reading device 21. In this case, the passage timing of the leading and trailing edges of the document is detected by the pre-reading sensor 17, and it is used as a reference of reading timing. The document winch has been read is ultimately discharged onto the document discharge tray 11 by the discharge roller 23.

Subsequently, the first cleaning device 18 and the second cleaning device 20 will be described. Since the first cleaning device 18 and the second cleaning device 20 are the same, the first cleaning device 18 will be explained as a representative. Hereinafter, unless it is necessary to particularly distinguish between the first cleaning device 18 and the second cleaning device 20, it is simply referred to as a "cleaning device 18". The front surface reading device 27 and back surface reading device 21 may also be simply referred to as a "reading device 27" unless it is particularly necessary to distinguish the front surface reading device 27 and back surface reading device 21 from each other.

Figure 3:
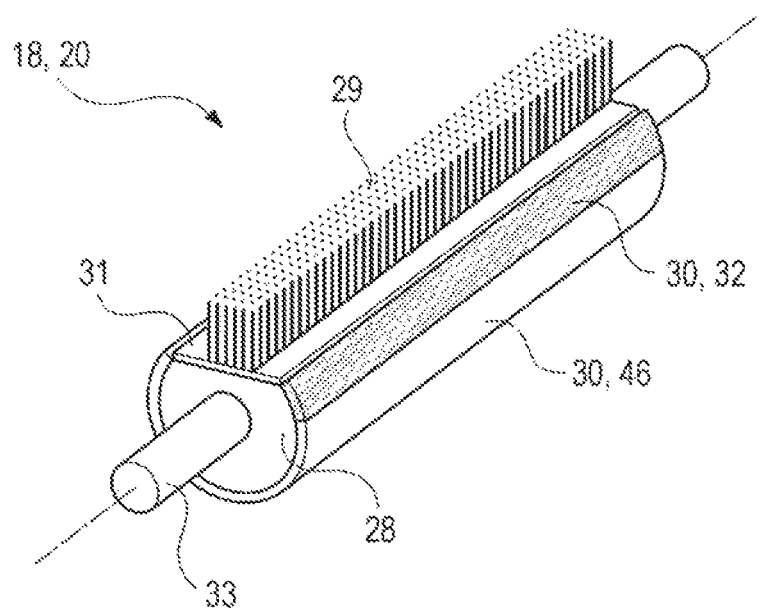
FIG. 3 is a perspective view illustrating a cleaning device in the embodiment.

The cleaning device 18 of which perspective view is illustrated in FIG. 3 includes a cleaning brush 29 provided with a rotation member 28 which is a cylindrical member with a part cut out. A cylindrical surface portion 30 and a fiat surface portion 31 are provided on the rotation member 28, and a cleaning brush 29 is provided on the flat surface portion 31. The length from the center of the rotation member 28 to the far end of the cleaning brush 29 is larger than the radius of the cylindrical surface portion 30 of the rotation member 28. As a result, the cylindrical surface portion 30 does not come into contact with the platen glass 24, but the cleaning brush 29 can come into contact with the platen glass 24.

A black area 32 is provided at a position of the cylindrical surface portion 30 adjacent to the flat surface portion 31. A rotation shaft 33 protrudes from both ends of the rotation member 28. The rotation member 28 is held in the automatic conveying mechanism 10 so that the rotation member 28 can be rotated together with the rotation shaft 33. Depending on the rotation angle, the cleaning brush 29 is directed to the reading position, the black area 32 is directed to the reading position, or a portion of the cylindrical surface portion 30 other than the black area 32 (hereinafter referred to as "white area 46") is directed to the reading position. The color of the black area 32 is a color having a darker (lower lightness) than the color of the white area 46.

Subsequently, the control system of the scanner unit 5 will be explained with reference to FIG. 4. In the control system of FIG. 4, a scanner CPU 34 is provided with the scanner 12, and an ADF CPU 35 is provided in the automatic conveying mechanism 10. Not only the scanner CPU 34 but also a first motor driving IC 36, a first motor 37, an image processing IC 38, and an operation panel 39 are provided in the scanner 12 in FIG. 4. The first motor driving IC 36 and the first motor 37 moves the exposure lamp 25 and the mirror group 26 when the manual feed scanning is performed. The image processing IC 38 receives image signals from the back surface reading device 21 and the front surface reading device 27. Although the back surface reading device 21 is actually provided in the automatic conveying mechanism 10, the back surface reading device 21 is included in scanner 12 for the sake of convenience in FIG. 4. The image processing IC 38 generates image data based on the received image signal and sends the image data to the control unit 8 shown in FIG. 1. As a result, an image is formed by the process unit 3. Alternatively, a printing job related to the image data may be sent from the image forming apparatus 1 to another image forming apparatus via a public line.

Figure 4:
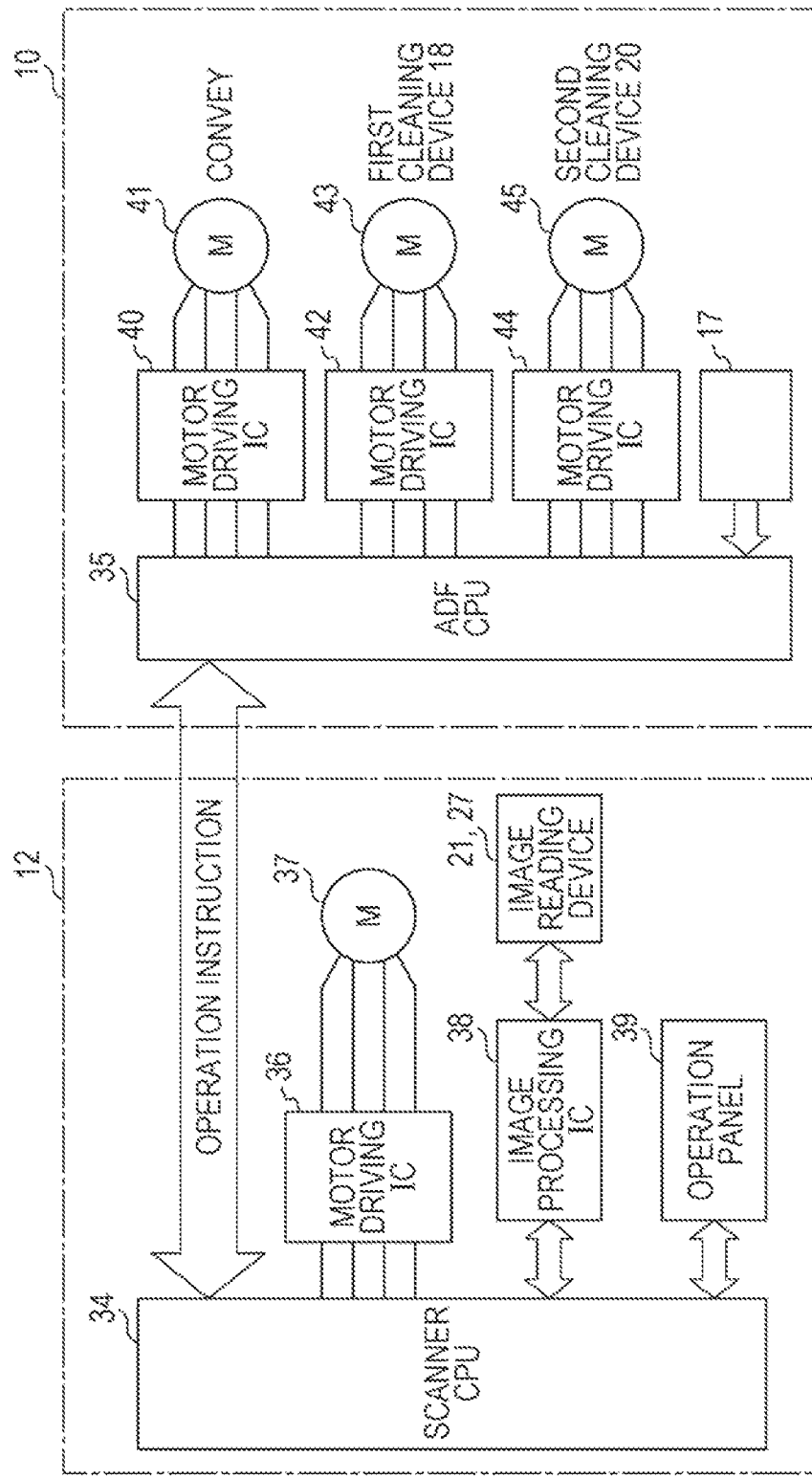
FIG. 4 is a block diagram illustrating a control system of the scanner unit according to the embodiment.

Not only the ADF CPU 35 but also a second motor driving IC 40, a second motor 41, a third motor driving IC 42, a third motor 43, a fourth motor driving IC 44, and a fourth motor 45 are provided in the automatic conveying mechanism 10 in FIG. 4. The second motor driving IC 40 and the second motor 41 are configured to drive the first reading roller 16, the second reading roller 19, the third reading, roller 22, and the discharge roller 23. The third motor driving IC 42 and the third motor 43 are configured to drive the first cleaning device 18. More specifically, the rotation shaft 33 of the first cleaning device 18 is connected to the third motor 43. The fourth motor driving IC 44 and the fourth motor 45 are configured to drive the second cleaning device 20. More specifically, the rotation shaft 33 of the second cleaning device 20 is connected to the fourth motor 45. The second motor driving IC 40, the third motor driving IC 42, and the fourth motor driving IC 44 are all connected to the ADF CPU 35. The ADF CPU 35 is also connected to the pre-reading sensor 17 described above.

Figure 5:
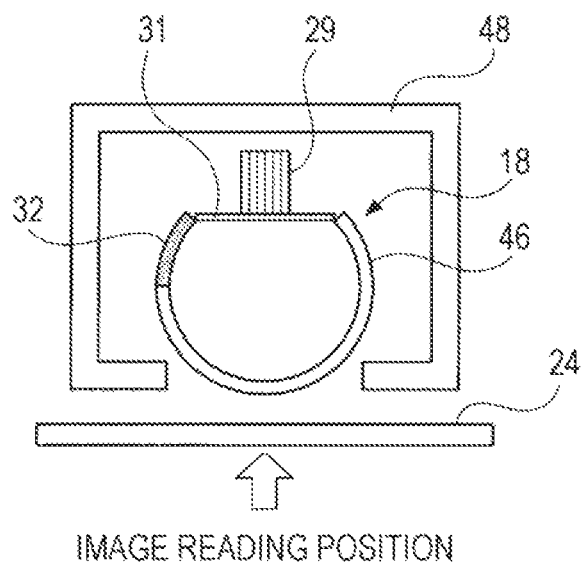
FIG. 5 is a cross-sectional view illustrating a state of a cleaning device during shading correction.

Subsequently, the operation of the scanner unit 5 according to this embodiment will be described. In the operations of the scanner unit 5, the distinctive feature of the present embodiment resides in the operation of the cleaning device 18 described above. The role achieved by the cleaning device 18 according to this embodiment is not limited to cleaning the reading position of the platen glass 24 with the cleaning brush 29. The document end portion detection function with the black area 32 and the white reference assigning function with the white area 46 are also the role achieved by the cleaning device 18. The latter is a function for known shading correction performed with an appropriate interval when the document is not read (FIG. 5).

Figure 6:
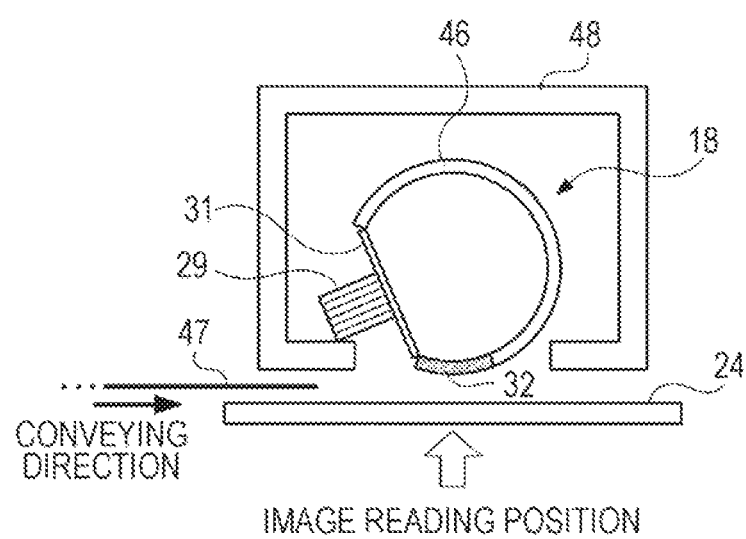
FIG. 6 is a cross-sectional view illustrating the state of the cleaning device when a document is read using the document end detection function.

The document end portion detection function with the black area 32 is a function achieved at the time of reading of document. When the document is read using this function, the cleaning device 18 is in such a state that the black area 32 faces the platen glass 24 as shown in FIG. 6. In this state, the document 47 is passed, and the image is read. Then, the position of the end portion of document 47 on image data read by reading device 27 is clear. This is because there is a large difference in the contrast between the paper color of the document 47 and the color of the black area 32. The end portions of the document 47 referred to herein is the end portions in the width direction, not the end portions in the leading and the trailing end portions in the traveling direction. In the state of FIG. 6, the cleaning brush 29 is in the standby state.

Thus, when the conveyed document 47 is at a position shifted in the width direction from its original paper passing position, this shift can be found by the image processing IC 38. Further, every when the positions of the document 47 in the width direction are displaced as the document 47 is conveyed, this displacement can be found by the image processing IC 38. The latter situation means that the document 47 is being conveyed in an inclined state. As a result, the image processing IC 38 can perform the end portion correction shown in FIG. 7. In end portion correction of FIG. 7, inclination correction and offset (shift in the width direction) correction are performed on a raw image read by the reading device 27. More specifically, the raw image includes the portion where the black area 32 is read. The image of document 47 is obtained by removing the portion where the black area 32 is read. The correction is made by calculating the inclination and deviation therefor. Whether or not the end portion correction is performed with this document end portion detection function can be selected by the user by with the operation panel 39.

Back to FIG. 6, when the black area 32 is facing the platen glass 24, the cleaning device 18 and the platen glass 24 are not in contact with each other. Therefore, in this state, the cleaning device 18 does not interfere with the document 47 transported on the platen glass 24. Even in the state of FIG. 5, the cleaning device 18 and the platen glass 24 are not in contact with each other, either. As is evident from FIG. 5 and FIG. 6, the cleaning device 18 is covered with a suitable housing 48 in reality.

The original role of the cleaning device 18 is the cleaning of the reading position of the platen glass 24 with the cleaning brush 29. The cleaning with the cleaning brush 29 is performed other than when the document is read. For example, suppose that a document is read in the state of FIG. 6 in order to perform the end portion correction mentioned above. After the conveying direction trailing edge of the document 47 passes the reading position, the cleaning device 18 is rotated counterclockwise in FIG. 6 to be in the state of FIG. 8. The far end of the cleaning brush 29 comes into contact with the platen glass 24 during this rotation. This will clean the reading position. This is the cleaning operation of the cleaning brush 29. Then, the cleaning device 18 is turned clockwise to return to the state of FIG. 6. Thereafter, the conveying direction-trailing end of a subsequent document 47 reaches the reading position. As a result, the cleaning operation is completed within the paper interval period. The point in time at which the trailing end of the document 47 passes the reading position is calculated from the point in time when the trailing end of the document 47 passes the pre-reading sensor 17, the conveying speed of the document 47, and the distance between the detection position of the pre-reading sensor 17 and the reading position. The conveying speed of the document 47 and the distance between the detection position of the pre-reading sensor 17 and the reading position are already known based on the specification of the automatic conveying mechanism 10.

In the present embodiment, with the above configuration of the cleaning device 18, it takes less time to perform the cleaning operation in the case of performing both of the end portion correction and the cleaning operation. This is because the black area 32 is provided at the position adjacent to the flat surface portion 31 in the cylindrical surface portion 30 as described above. For this reason, the black area 32 and the cleaning brush 29 are at relatively close positions. Therefore, when the cleaning device 18 returns back from the state of FIG. 6 to the state of FIG. 6 via the state of FIG. 8, it is not necessary for the white area 46 to be a state of facing the platen glass 24 (FIG. 5). As a result, the interval between the conveyed documents 47, i.e., the paper interval, can be reduced.

Figure 9:
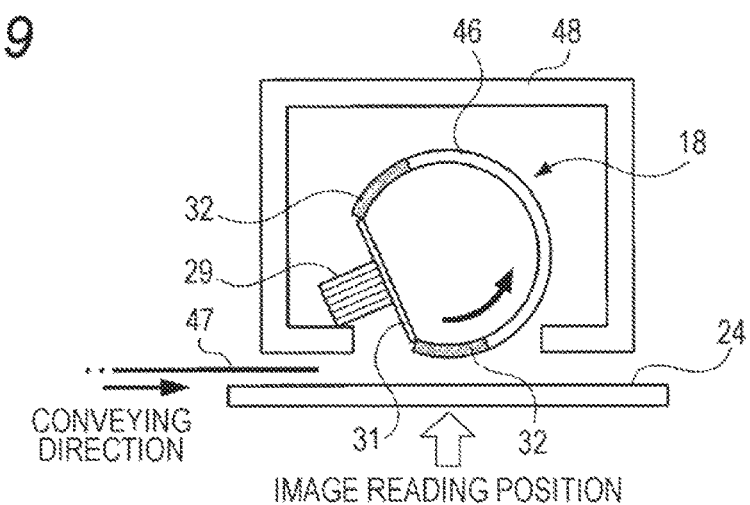
FIG. 9 is a cross-sectional view (part 1) illustrating the state at the time of reading when there are black areas at two positions.
Figure 10:
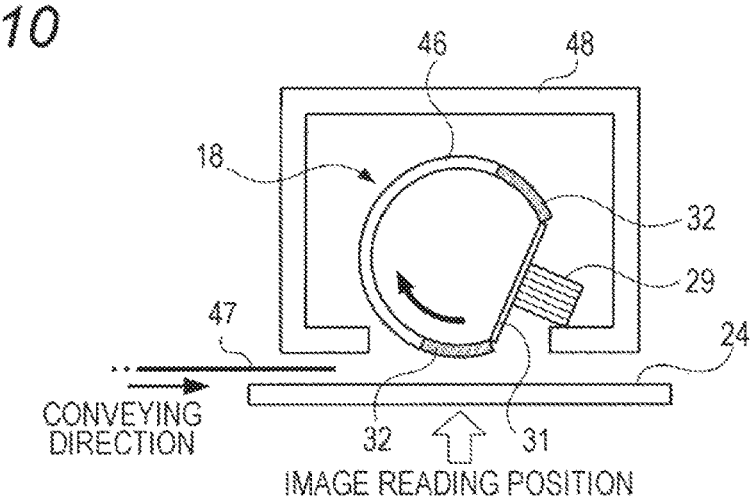
FIG. 10 is a cross-sectional view (part 2) illustrating the state at the time of reading when there are black areas at two positions.

The black areas 32 in the cleaning device 18 can be provided at two positions adjacent to the flat surface portion 31. In this case, the time required for the cleaning operation can be further reduced as shown in FIG. 9 and FIG. 10. More specifically, the reading operation is performed on the plurality of consecutively conveyed documents 47 by alternately using the state of FIG. 9 and the state of FIG. 10 in order to perform the end portion correction. Then, it is unnecessary to rotate the cleaning device 18 reciprocally in the cleaning operation in each paper interval. Therefore, the time required for the cleaning operation is even shorter. However, the rotation direction of the cleaning device 18 is reversed in every cleaning operation.

The black area 32 in the present embodiment has a certain width with respect to the rotation angle of the cleaning device 18. This is greater than the minimum width required for end portion correction. Therefore, in the present embodiment, the document is read in the end portion correction by using the best position for the end portion correction in the black area 32. When some foreign materials (such as paper dusts) adhere to the black area 32, the precision of the end portion detection of the document 47 is reduced due to the foreign materials (such as paper dusts). The best position for the end portion correction is the position with the least foreign material adhesion. The procedure for defining the position (home position) that is actually used for reading the document at the time of execution of the end portion correction with the black area 32 will be explained with reference to FIG. 11.

Figure 11:
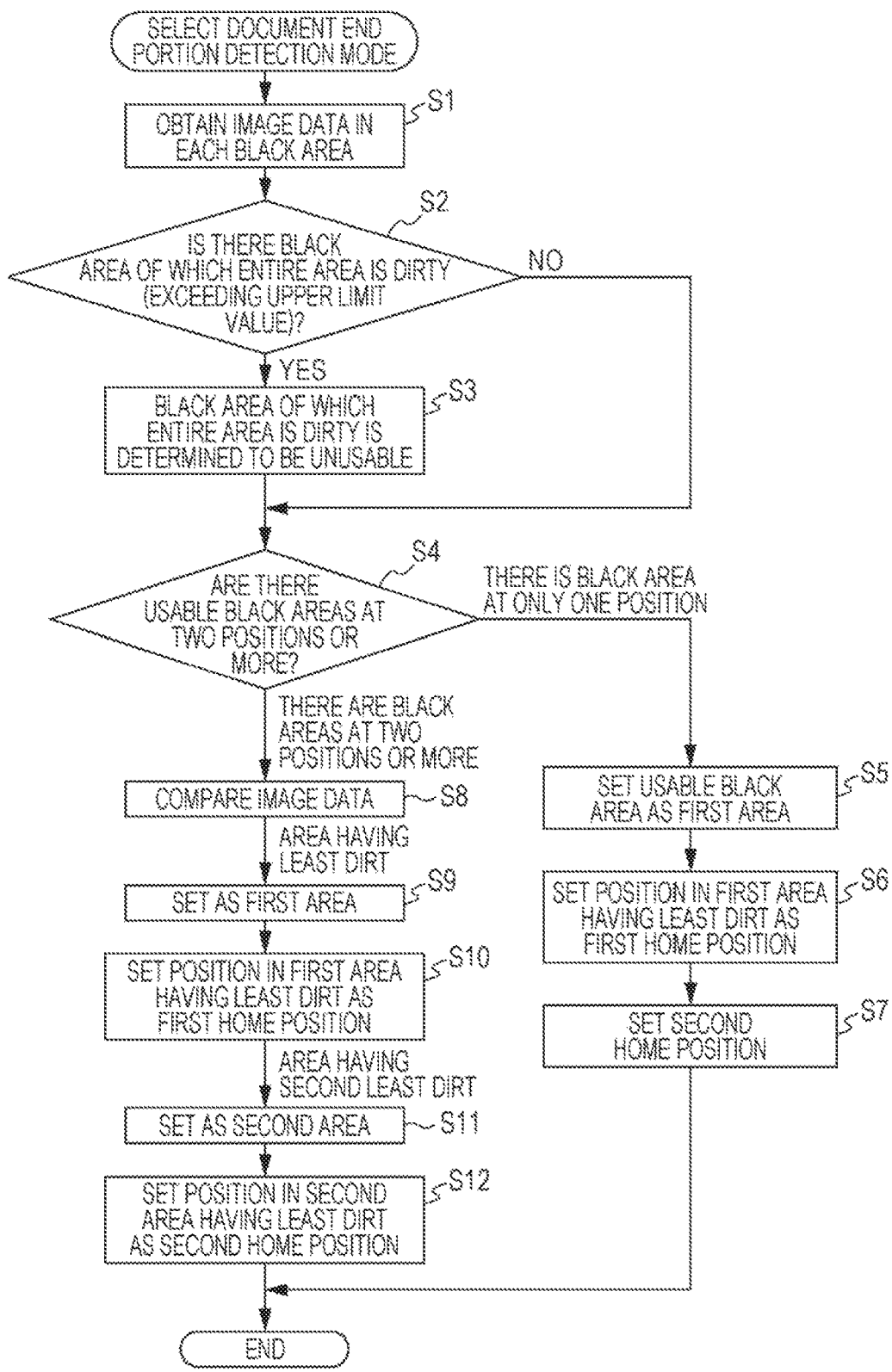
FIG. 11 is a flowchart illustrating the content of a home position setting mode.

In this case, when the user operates the operation panel 39 to select execution of the end portion correction with the document end portion detection function (document end portion detection mode), the flow of FIG. 11 is configured to he executed. It is to be understood that this flow is executed without passing any document 47.

In this flow, first, a read image at each position is obtained by slightly changing the rotation angle of the cleaning device 18 in the black area 32 (S1). As shown in FIG. 9 and the like, if there are black areas 32 at multiple positions, image at each position in that area is obtained or each of all the black areas 32. Each image obtained here is a long and narrow image which extends over the entire reading width in the main scanning direction but which has only one pixel unit in the sub-scanning direction. An image obtained from a position without any attachment of foreign material should be entirely in black color, but an image obtained from a position where a foreign material adheres is an image in which the position of foreign material is white. An allowable upper limit value for the white positions per image is defined in advance.

Subsequently, a determination is made as to whether there is a black area 32 of which entire area is dirty (S2). In other words, if any of the images obtained in S1 from the black area 32 contains a number of white positions which is more than the upper limit value, then, this means that the entire black area 32 is dirty. When there are black areas 32 at multiple positions, a determination is made whether the entire area is dirty or not for each of all of the multiple black areas 32. Then, if there is at least one black area 32 which is determined to be dirty in its entirety, the determination of S2 is "present".

When the determination in S2 is "present", the black area 32 of which entire area is determined to be dirty is determined to be "unusable" (S3). Black areas 32 other than that is determined to be "usable". When the determination at S2 is "absent", processing in S3 is skipped and all the existing black areas 32 are determined to be "usable".

Then, a determination is made as to whether there is a black area 32 at only one position or there are "usable" black areas 32 at two positions or more (S4). When there is a black area 32 at only one position, S5 is subsequently performed, and if there are "usable" black areas 32 at two positions or more, S8 is subsequently performed. In addition, if there is no "available" black area 32, the selection of the document end portion detection mode is forcibly canceled and an alarm is issued to the user, which is omitted in FIG. 11.

Figure 8:
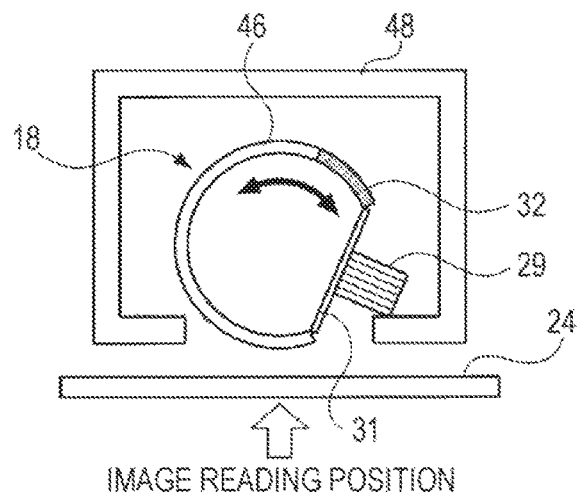
FIG. 8 is a cross-sectional view explaining the cleaning operation with the cleaning device.

When there is a "usable" black area 32 at only one position in S4, the "usable" black area 32 is set as a "first area" (S5). Further, the position in the "first area" at which an image with the least white positions has been obtained is set as a "first home position" (S6). Then, a "second home position" is set (S7). The "second home position" set in S7 is a position to reverse the rotation direction of the cleaning device 18 as shown in FIG. 8. This may be a position where the cleaning of the reading position with the cleaning brush 29 is reliably performed. It may be the position shown in FIG. 8, or the central position of the black area 32 which is determined to be "unusable" may be set as the "second home position". Therefore, thereafter, a document is read according to the method described in FIG. 6, with the "first home position" being set to face the platen glass 24. When the platen glass 24 is to be cleaned, the "second home position" is used with the method described in FIG. 6 and FIG. 8.

When there are "usable" black areas 32 at two positions or more in S4, the total numbers of white positions in all the black areas 32 determined to be "usable" are compared (S8). Then, a black area 32 in which the total number of white positions therein is the least is set as the "first area" (S9). In addition, the position in the "first area" at which an image with the least white positions has been obtained is set as a "first home position" (S10). A black area 32 in which time total number of white positions therein is the second smallest is set as a "second area" (S11). In addition, the position in the "second area" at which an image with the least white positions has been obtained is set as a "second home position" (S12). Therefore, thereafter, the reading of the document and the cleaning of the platen glass 24 are carried out by the method described in FIG. 9 and FIG. 10 by alternately using the "first home position" and the "second home position".

Alternatively, S9 to S12 explained above may be executed as follows. Throughout all of the black areas 32 determined to be "usable", the position at which an image with the least white positions has been obtained is set as a "first home position". Then, the black area 32 including the "first home position" is determined to be a "first area". Further, in black areas 32 other than the "first area", the position at which an image with the least white positions has been obtained is set as a "second home position". Then, the black area 32 including the "second home position" is determined to be a "second area". In any case, each of the "first home position" and, the "second home position" is the least dirty position in the black area 32 to which it belongs.

In the cleaning device 18, black areas 32 may be provided at a position away from the flat surface portion 31 in addition to the black areas 32 at the positions on both sides of the flat surface portion 31 shown in FIG. 9 and others. However, even in such a configuration, the positions set as the above "first home position" or "second home position" may be limited to black areas 32 at two positions on both sides of the flat surface portion 31. The above is the setting of the home position.

Figure 12:
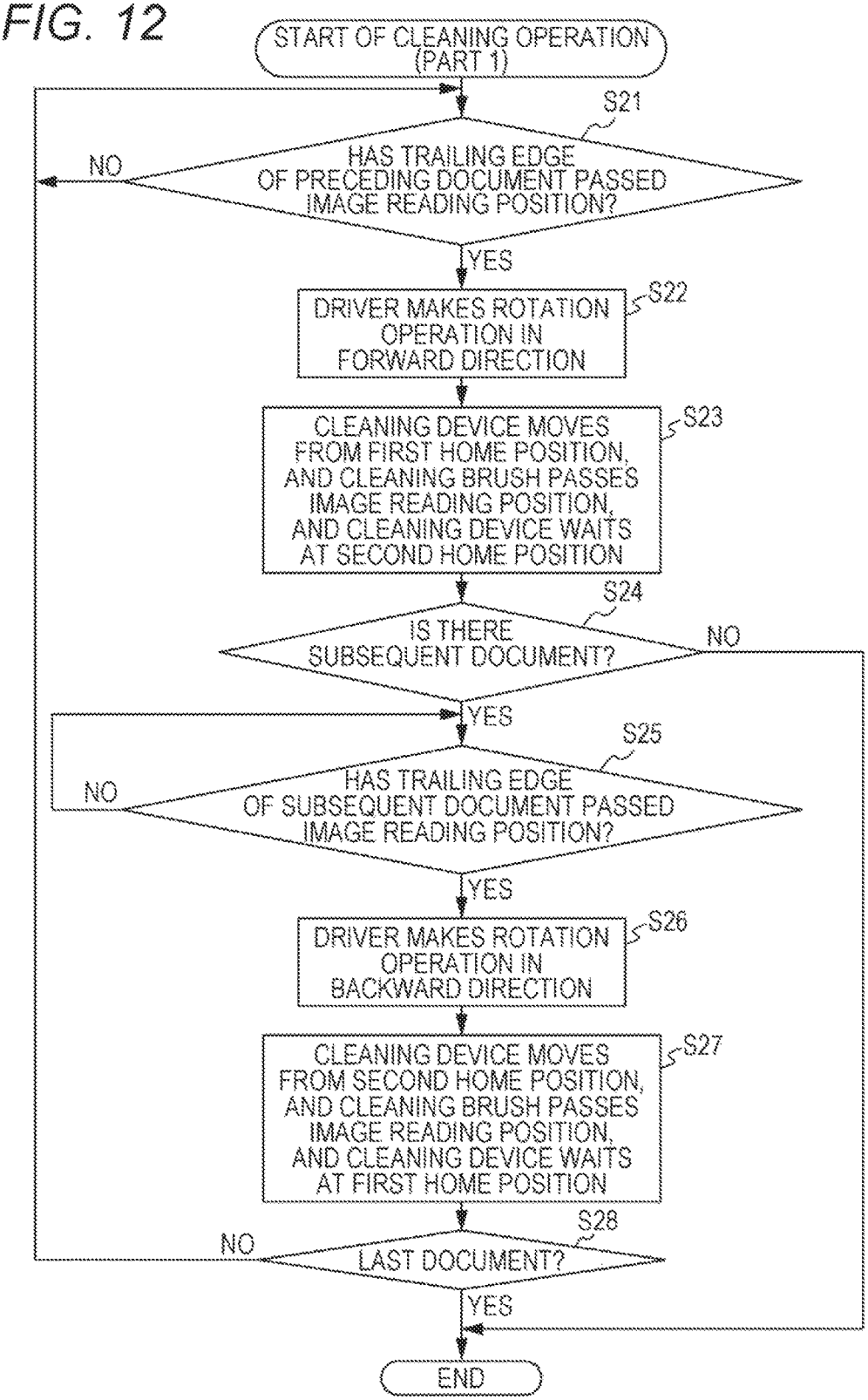
FIG. 12 is a flowchart of cleaning operation when black areas at two positions are used.

Subsequently, FIG. 12 illustrates the control flow of the cleaning operation according to the method described in FIG. 9 and FIG. 10. In the case where cleaning operation is performed according to this flow, the first document 47 starts to be read while the "first home position", which is set in S9 to S12 of FIG. 11 chosen from among the "first home position" and the "second home position", is arranged to face the platen glass 24. Then, while reading processing is performed to read a bundle of documents placed on the document tray 9, this flow is in the execution state at all times. Any one of FIG. 9 and FIG. 10 may be the "first home position", but in this explanation, FIG. 9 is assumed to be the "first home position", FIG. 10 is assumed to be the "second home position".

When entering into the flow of FIG. 12, the cleaning device 18 waits for a point in time when the trailing edge of the preceding document 47 (the first document) passes the reading position on the platen glass 24 (S21). As described above, the point in time when the trailing edge of the document passes the reading position can be obtained based on the point in time when the pre-reading sensor 17 detects the document. When the trailing edge of the document passes the reading position (S21: Yes), the cleaning device 18 is rotated forward (counterclockwise in FIG. 9) (S22). This rotation causes the cleaning brush 29 to pass the reading position, at which time the cleaning is performed. The forward rotation of the cleaning device 18 further continues until the "second home position" faces the platen glass 24. In that state (FIG. 10), the normal rotation of the cleaning device 18 is stopped (S23). Then, a determination is made as to whether or not there is a subsequent document 47 (S24). When not (S24: No), the flow of FIG. 12 is terminated.

When there is a subsequent document 47 (S24: Yes), then the subsequent document 47 is read, and the cleaning device 18 waits for the point in time when the trailing edge of the subsequent document 47 passes the reading position on the platen glass 24 (S25). When the trailing edge of the subsequent document passes the reading position (S25: Yes), the cleaning device 18 is rotated in the reverse direction (clockwise in FIG. 10) (S26). As a result, the cleaning is performed with the cleaning brush 29 in a manner similar to S22 while the cleaning device 18 rotates in an opposite rotation direction. Then, when the "first home position" faces the platen glass 24 again, the backward rotation of the cleaning device 18 is stopped (S27). The cleaning device 18 returns back to the state shown in FIG. 9.

Then, a determination is made as to whether the document 47 read now, i.e., the document 47 of which trailing edge has passed in S25, is the last one in the bundle of documents (S28). When the document 47 read now, i.e., the document 47 of which trailing edge has passed in S25, is the last one (S28: Yes), the flow of FIG. 12 is terminated. When the document 47 read now, i.e., the document 47 of which trailing edge has passed in S25, is not the last one (S28: No), S21 is subsequently performed, and the processing is repeated for the subsequent document 47. After that, the document in S21 may be considered to be an odd number document and the document in S25 may be considered to be an even number document. The above is the cleaning operation when black areas 32 at two positions are alternately used. The amount of rotation during the rotation of the cleaning device 18 can be managed according to the type of the third motor 43 (also according to the type of the fourth motor 45 in a similar manner). For example, in the case of a stepping motor, the amount of rotation during the rotation of the cleaning device 18 may be managed according to the number of pulses. When it is a DC motor, the amount of rotation during the rotation of the cleaning device 18 may be managed according to the rotation time.

Figure 13:
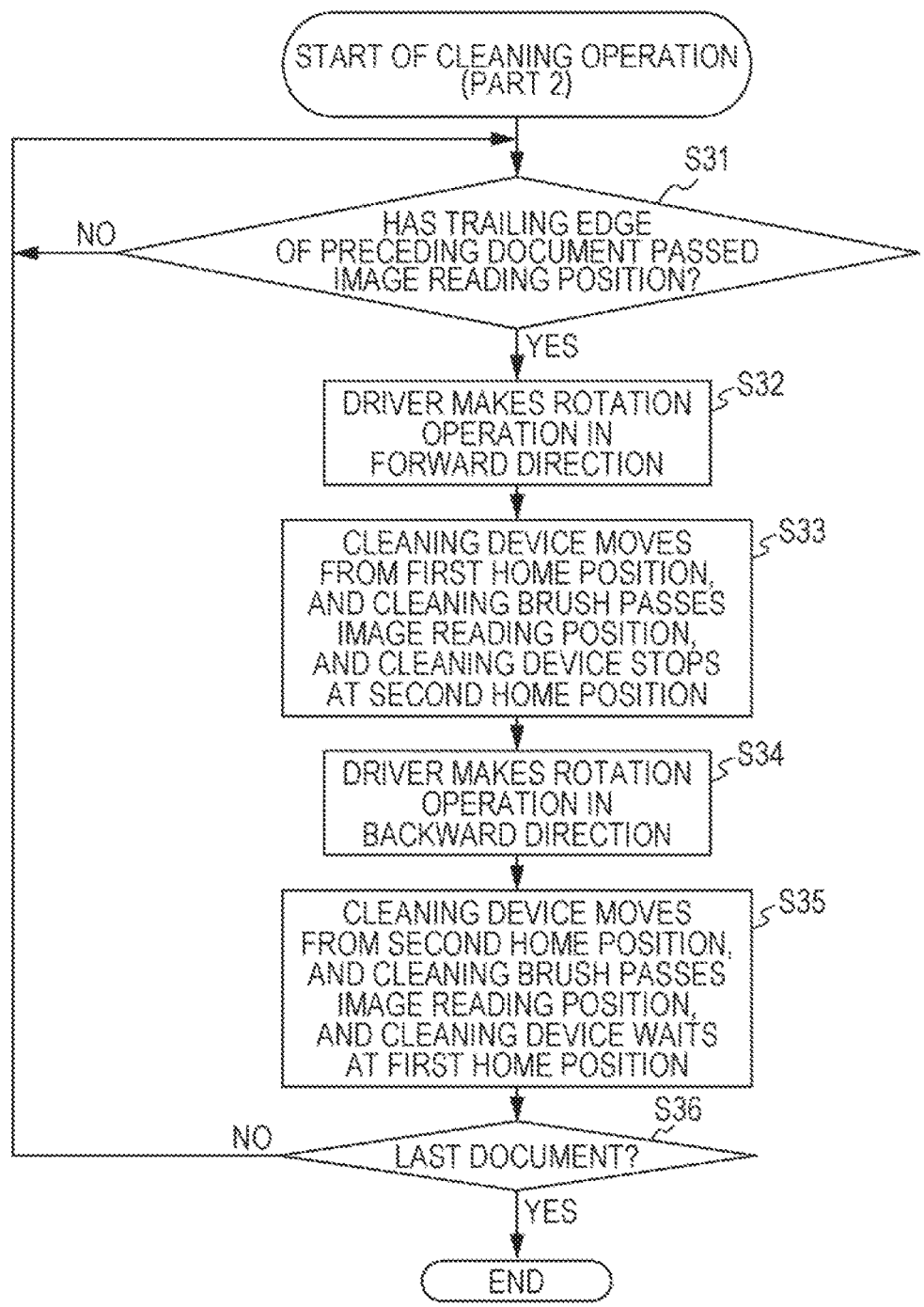
FIG. 13 is a flowchart of cleaning operation when a black area at one position is used.

Subsequently, FIG. 13 illustrates the control flow of the cleaning operation according to the method described in FIG. 6 and FIG. 8. When the cleaning operation is performed according to this flow, the first document 47 starts to be read while the "first home position", which is set in S6 of FIG. 11, is arranged to face the platen glass 24 (FIG. 6). While reading processing is performed to read a bundle of documents placed on the document tray 9, this flow is also in the execution state at all times.

When entering into the flow of FIG. 13, the cleaning device 18 waits for a point in time when the trailing edge of the document 47 passes the reading position on the platen glass 24 (S31). When the trailing edge of the document passes the reading position (S31: Yes), the cleaning device 18 is rotated forward (counterclockwise in FIG. 6) (S32). This is done by the cleaning brush 29. Then, the forward rotation of the cleaning device 18 is carried out until the "second home position" faces the platen glass 24 (FIG. 8) (S33). The "second home position" here is the position set in S7 of FIG. 11.

Then, backward rotation of the cleaning device 18 is performed immediately (S34). This backward rotation continues until the "first home position" faces the platen glass 24 again (FIG. 6) (S35). It should be understood that, during this backward rotation, the cleaning brush 29 once comes into contact with the platen glass 24. When returning back to the state of FIG. 6, a determination is made as to whether or not the document 47 read now, i.e., the document 47 of which trailing edge passed in S31, is the last one in the bundle of documents (S36). When the document 47 read now, i.e., the document 47 of which trailing edge passed in S31, is the last one (S36: Yes), the flow of FIG. 13 is terminated. When the document 47 read now, i.e., the document 47 of which trailing edge passed in S31, is not the last one (S36: No), S31 is subsequently performed, and the processing is repeated on the subsequent document 47.

In this processing of FIG. 13, the cleaning device 18 is rotated reciprocally in one paper interval, and the cleaning brush 29 comes into contact with the platen glass 24 twice. Nevertheless, the cleaning operation takes less time than moving from the "first home position" to the "first home position" with only the forward rotation of the cleaning device 18. This is because the "first home position" and the "second home position" are at positions within a relatively close angular range from the cleaning brush 29.

Whether the cleaning operation is performed according to the flow of FIG. 12 or the flow of FIG. 13 depends on the number of black areas 32 in the cleaning device 18, and more particularly, it depends on the number of valid black areas 32 that are not determined to be "unusable" in S3 of FIG. 11. In the case where a cleaning device 18 originally having a black area 32 at only one position is used, the cleaning operation is performed according to the flow of FIG. 13. The same applies even when there is a valid black area 32 at only one position even when the black areas 32 are provided at two positions or more. When there are valid black areas 32 at two positions or more, the flow of FIG. 12 can be used. The user may be allowed to select which flow to be used in this case with the operation panel 39.

Figure 14:
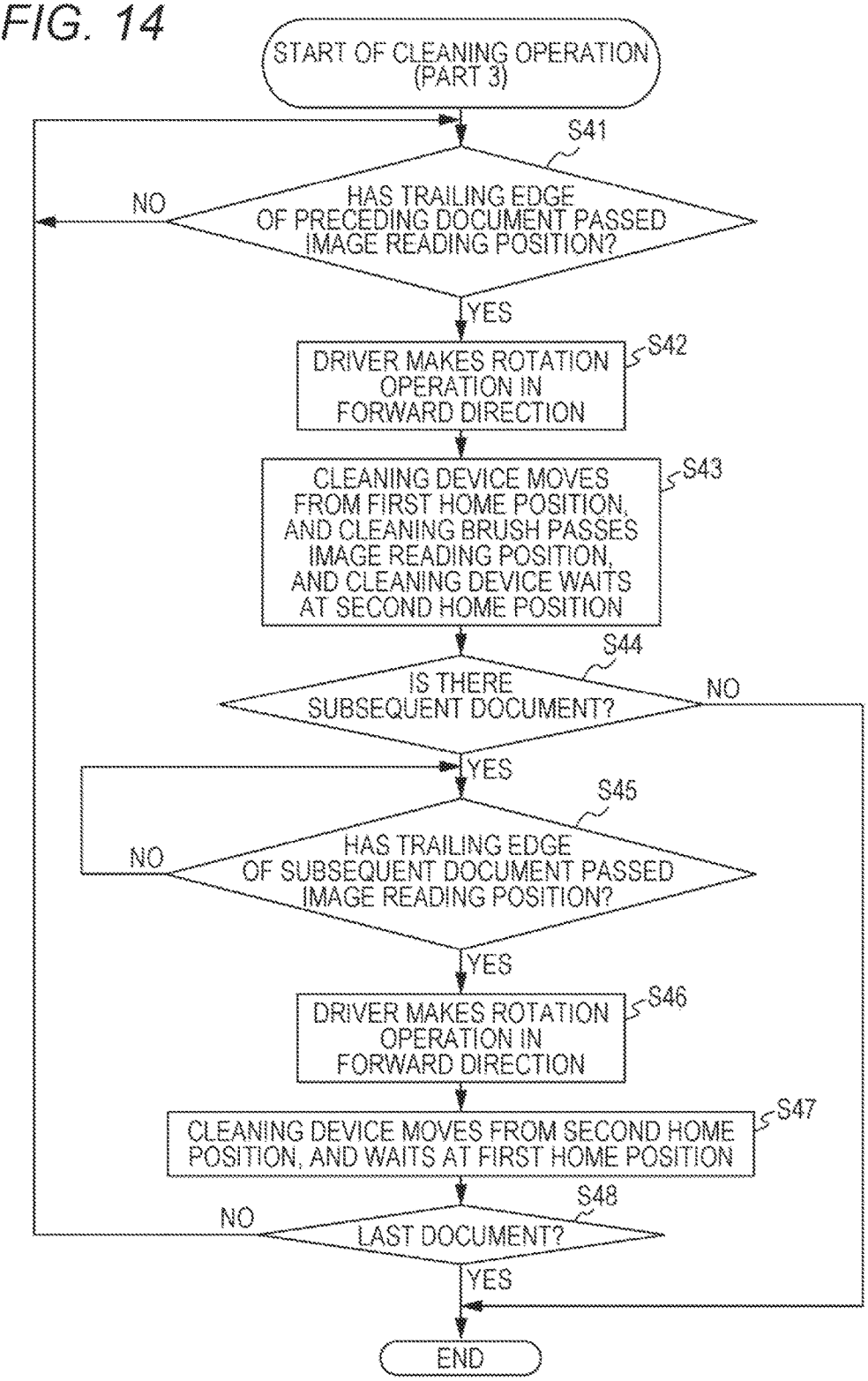
FIG. 14 is a flowchart of cleaning operation when cleaning is performed once every two paper intervals.

In the above description, it is assumed that the cleaning of the platen glass 24 with the cleaning brush 29 is performed every time a document 47 is read. But the cleaning of the platen glass 24 with the cleaning brush 29 may not be performed at all times every time a document 47 is read. The cleaning may be performed once for multiple paper intervals. FIG. 14 illustrates the control flow of the cleaning operation when the cleaning is performed once for every two paper intervals. In this flow, the cleaning device 18 shown in FIG. 9 and FIG. 10 having the black areas 32 at two positions is considered to be used. It is assumed that any of black areas 32 at two positions is "useble", and the "first home position" or the "second home position" is designated. When the cleaning operation is performed according to this flow, the first document 47 starts to be read at the "first home position" in FIG. 9.

When entering into the flow of FIG. 14, the cleaning device 18 waits for a point in time when the trailing edge of the preceding document 47 (first document) passes the reading position on the platen glass 24 (S41). When the trailing edge of the document passes the reading position (S41: Yes), the cleaning device 18 is rotated forward (S42). This rotation causes the reading position to be cleaned with the cleaning brush 29. The cleaning device 18 rotates forward until the "second home position" faces the platen glass 24 (FIG. 10), and the cleaning device 18 stops there (S43). Then, a determination is made as to whether there is any subsequent document 47 (S44). When there is no subsequent document 47 (S44: No), the flow of FIG. 14 is terminated.

When there is a subsequent document 47 (S44: Yes), the reading of the subsequent document 47 continues, and the cleaning device 18 waits for the point in time when the trailing edge passes the reading position (S45). When the trailing edge of the subsequent document passes the reading position (S45: Yes), the cleaning device 18 is rotated forward (counterclockwise in FIG. 10) (S46). It is not a backward rotation. Therefore, at this time, the cleaning with the cleaning brush 29 is not performed. The cleaning brush 29 goes through the other side of the platen glass 24 (see FIG. 5 for reference). Then, when the cleaning device 18 returns back the state of the "first home position" (FIG. 9), the rotation of the cleaning brush 29 is stopped (S47).

Figure 15:
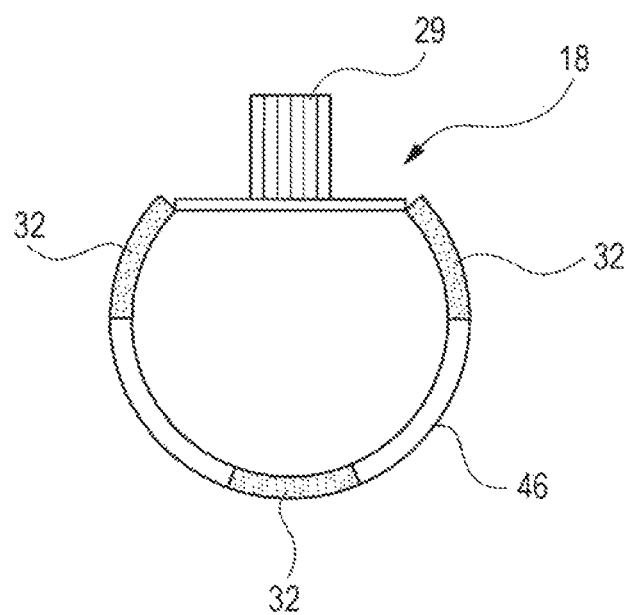
FIG. 15 is a cross-sectional view illustrating a cleaning device having black areas at three positions.

In this case, a determination is made as to whether or not the document 47 of which trailing edge passed the reading position in S45 is the last one (S48). When the document 47 of which trailing edge passed the reading position in S45 is determined to be the last one (S48: Yes), the flow of FIG. 14 is terminated. When the document 47 of which trailing edge passed the reading position in S45 is not the last one (S48: No), S41 is subsequently performed to repeat the processing. As a result, the cleaning can be performed once in every two paper intervals. In the case of this flow of FIG. 14, backward rotation of the cleaning device 18 is unnecessary. The cleaning can be performed once in every three paper intervals, when a cleaning device 18 having black areas 32 at three positions as shown in FIG. 15 is used. The cleaning can be configured to be performed once in every three or more paper intervals.

Figure 16:
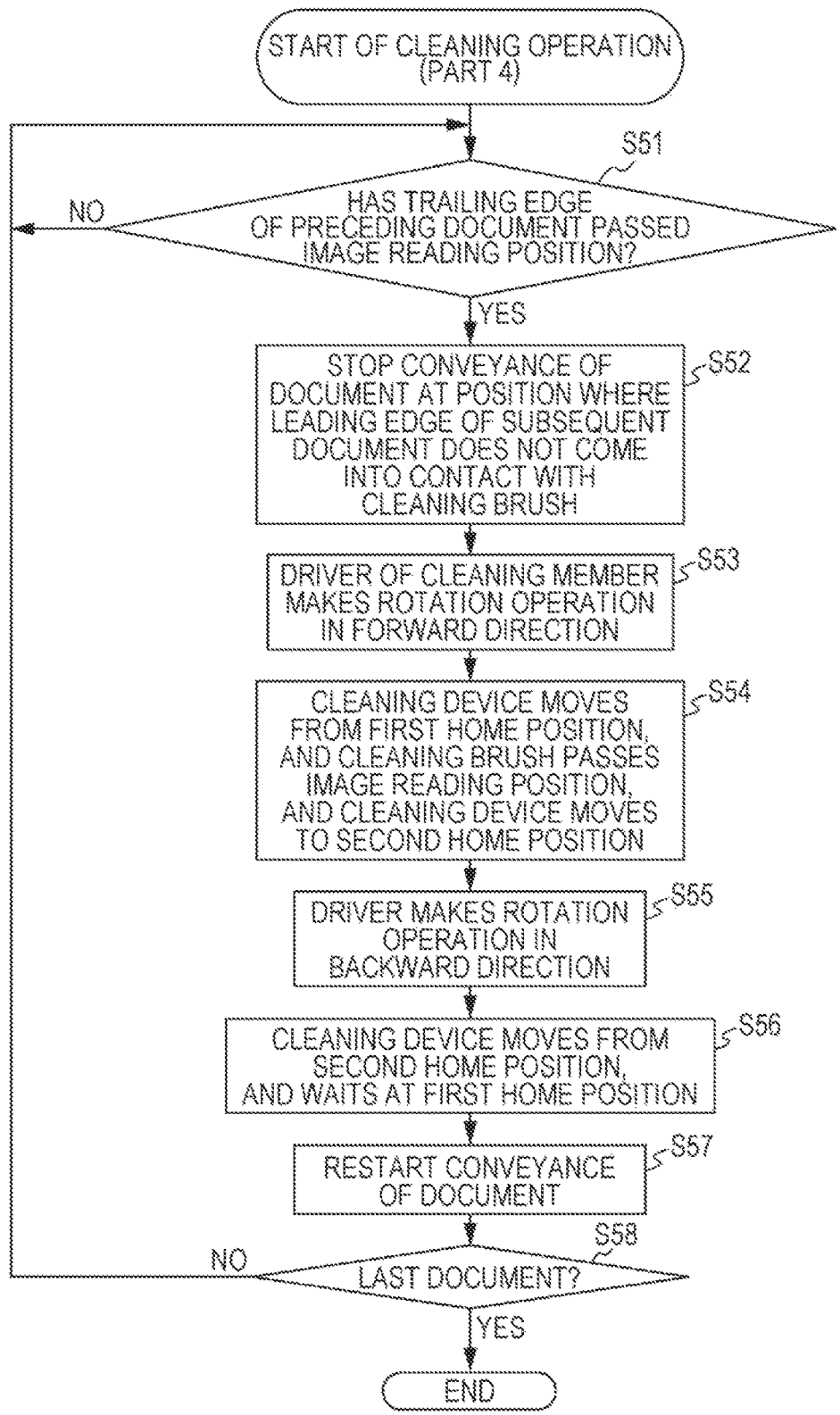
FIG. 16 is a flowchart in a case where a paper interval is extended for cleaning operation.

FIG. 16 illustrates the control flow for performing the cleaning operation by increasing the paper intervals. In the case of this flow, when the trailing edge of the document passes the reading position (S51: Yes), the conveyance of the document 47 is temporarily stopped (S52). The stop position where the document 47 stops at this time is a position at which the contact between the document 47 and the cleaning brush 29 does not occur even if the reading position is cleaned with the cleaning brush 29. Then, due to the reciprocating rotation of the cleaning device 18, the cleaning device 18 moves from the "first home position" (FIG. 6) to the "second home position" (FIG. 8) and then returns back to the "first home position" again (S53 to S56). In the meantime, the cleaning is performed with the cleaning brush 29. Thereafter, the conveyance of the document 47 is restarted (S57). When it is the last document (S58: Yes), the processing is terminated. In this case, while the conveyance of the document 47 is stopped (S52 to S57), the feeding of the document 47 from the document tray 9 is temporarily stopped either.

The control flow in FIG. 16 is used, for example, in a case where the cleaning is performed once in every two or more paper intervals, and the feeding interval of the document 47 from the document tray 9 is set assuming that the cleaning is not performed. Alternatively, the control flow in FIG. 16 is used, for example, in a case where the feeding interval is set so as to perform the cleaning operation according to the flow of FIG. 12, but there is only one valid black area 32 which is determined to be "usable".

Figure 17:
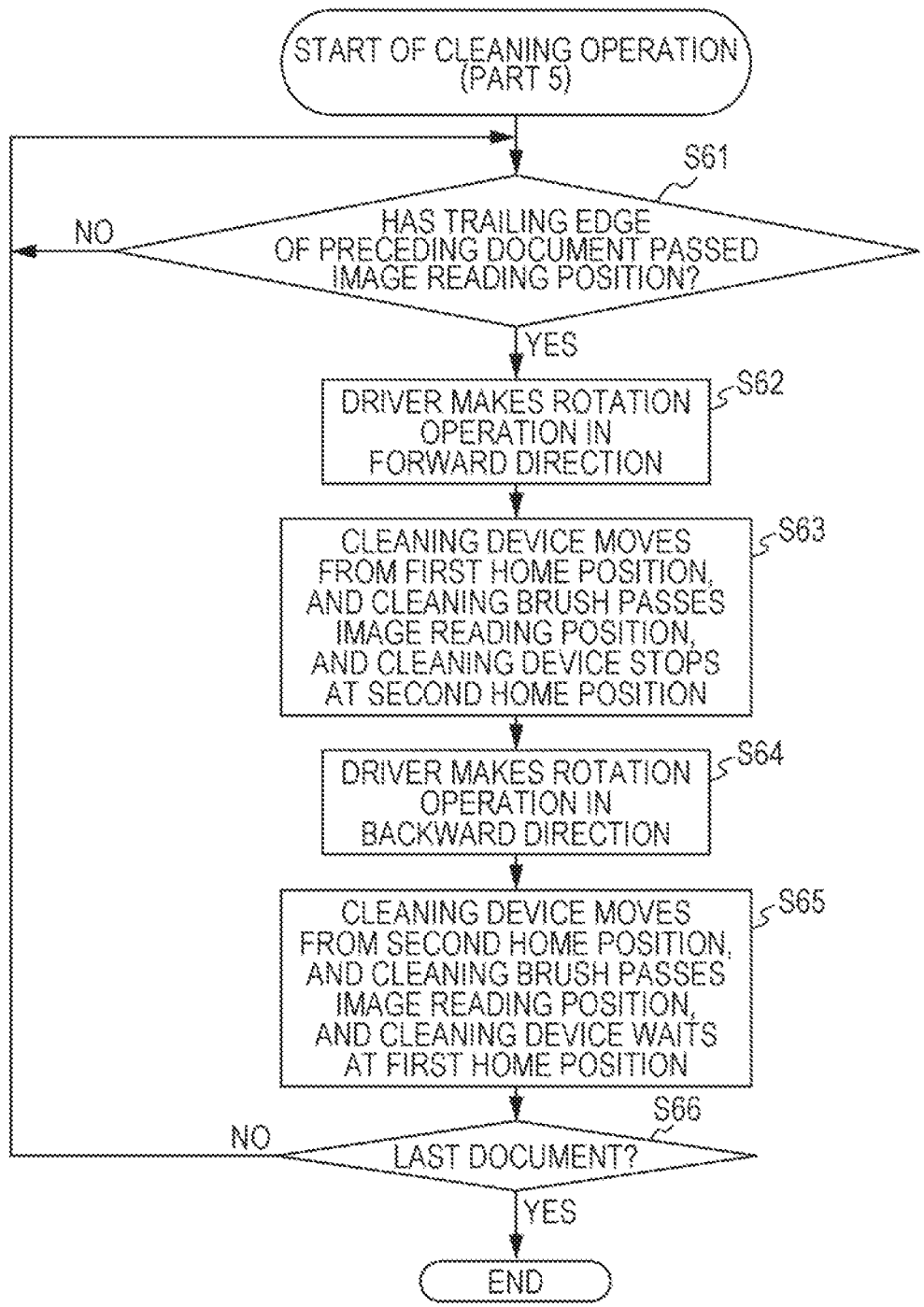
FIG. 17 is a flowchart of the cleaning operation in a cleaning improvement mode (twice)
Figure 18:
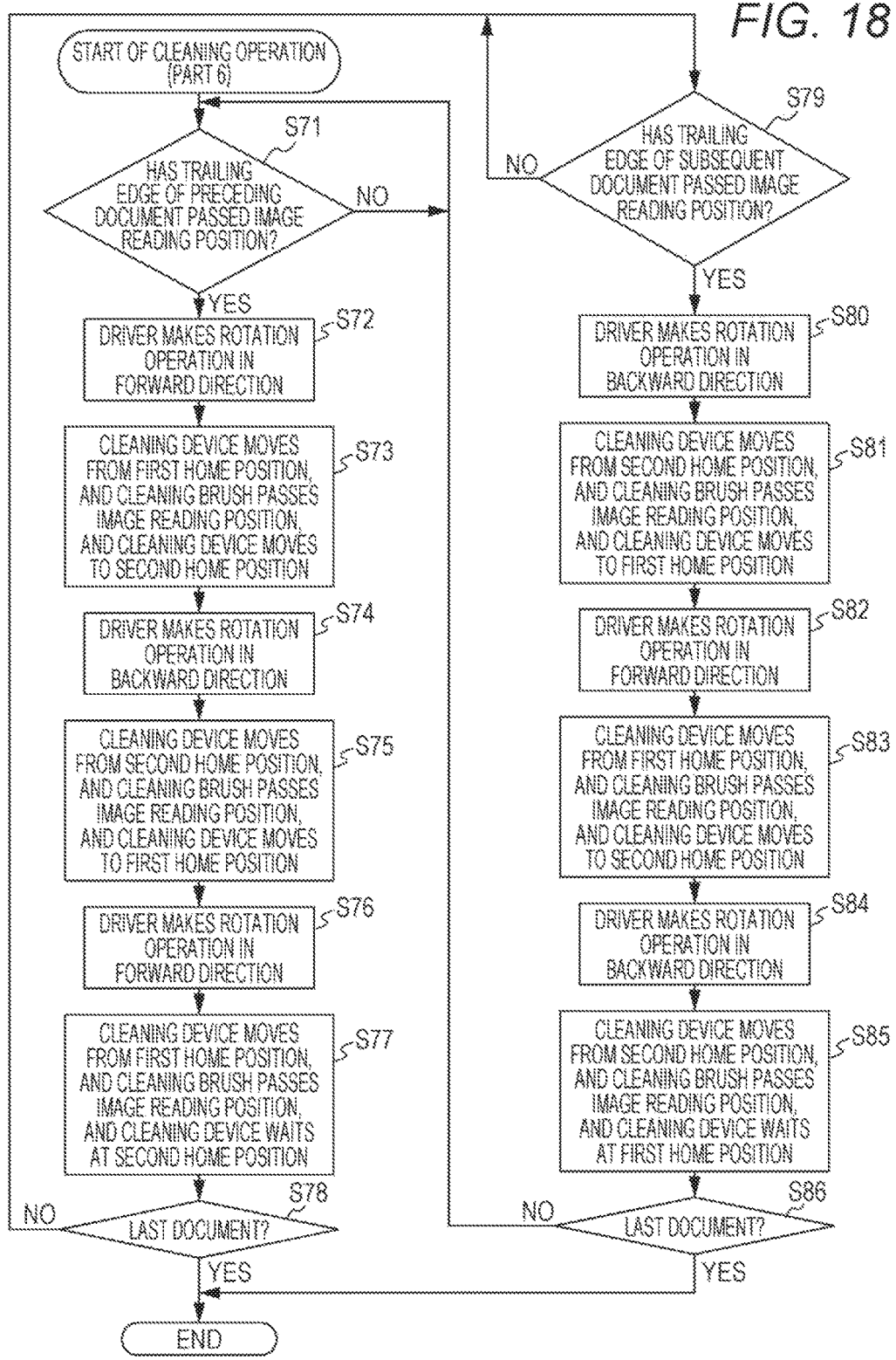
FIG. 18 is a flowchart of the cleaning operation in a cleaning improvement mode (three times).

In the present embodiment, the cleaning performance improvement mode can be selected by a user by making selection with the operation panel 39. FIG. 17 illustrates the control flow when the cleaning is performed twice in the cleaning performance improvement mode. FIG. 18 illustrates the control flow in the case of cleaning three times in the cleaning performance improvement mode.

In the case of the flow in FIG. 17, the initial state is the state of the "first home position" (FIG. 6). When entering into this flow, the cleaning device 18 waits for the point in time when the trailing edge of the document 47 passes the reading position (S61). When the trailing edge of the document passes the reading position (S61: Yes), the cleaning device 18 is rotated in the forward direction (S62). The forward rotation is performed until the cleaning device 18 reaches the state of the "second home position" (FIG. 8) (S63). Then, the reverse rotation is performed immediately (S64). As a result, the cleaning device 18 goes into the standby state of the "first home position" again (FIG. 6) (S65). When there is a subsequent document 47, the processing is repeated (S66: No). When not, this flow is terminated (S66: Yes). In this flow, the cleaning is performed twice in S63 and S65 with every paper interval. In this regard, the cleaning performance has been improved.

In the case of the flow in FIG. 18, the initial state is the "first home position" state (FIG. 9). In this flow, the cleaning device 18 waits for the point in time when the trailing edge of the document 47 passes the reading position (S71). When the trailing edge of the document passes the reading position (S71: Yes), the cleaning device 18 is rotated forward (S72) to be in the state of the "second home position" (FIG. 10) (S73). Then, immediately, the cleaning device 18 rotates backward (S74) to return back to the state of the "first home position" (FIG. 9) (S75). Their, the cleaning device 18 rotates forward again (S76) to be in the state of the "second home position" (FIG. 10) (S77). When there is no subsequent document 47, the flow is terminated (S78: Yes), and if there is a subsequent document 47, the cleaning device 18 waits for the point in time when the trailing edge of the subsequent document passes the reading position (S78: No, S79).

When the trailing edge of the subsequent document passes the reading position (S79: Yes), the processing in S80 to S85 is performed. The processing in S80 to S85 is processing in which forward rotation and backward rotation are replaced with each other in the processing of S72 to S77 and furthermore the "first home position" and the "second home position" are replaced with each other. When there is no subsequent document 47, the flow is terminated (S86: Yes), and if there is a subsequent document 47, S71 is performed again (S86: No). In this flow, the cleaning is performed three times in S73, S75, and S77 (or S81, S83, and S85) with every paper interval. In this regard, the cleaning performance has been improved.

In the above description about each flow, the first cleaning device 18, which is one of the first cleaning device 18 and the second cleaning device 20, has been taken into account, but the above description about each flow is also applicable to the second cleaning device 20 as described above.

As described above in details, according to the present embodiment, not only tire cleaning brush 29 but also the black areas 32 and the white area 46 are provided on the cleaning device 18 (the first cleaning device 18 and the second cleaning device 20) which is a member for cleaning the reading position of the platen glass 24. In particular, the black area 32 is arranged at a position close to the cleaning brush 29. This makes it possible to perform the cleaning operation in a short period of time with the paper interval while using the document end portion detection function by passing the document 47 with the black area 32 facing the reading position.

When the black areas 32 are at multiple positions, the cleaning operation can be performed in a shorter period of time. Alternatively, when the rotation of the cleaning device 18 is reversible, the cleaning operation can be performed in a short period of time even if the usable black area 32 is at only one position. In the present embodiment, furthermore, the position with the least dirt in the black area 32 is set as the "home position". Therefore, the document end portion detection function can be performed in a preferable manner.

Although embodiments of the present invention have been described and illustrated in detail, it is clearly understood that the same is by way of illustration and example only and not limitation, the scope of the present invention should be interpreted by terms of the appended claims. Therefore, it should be understood that the present invention can be improved in various manners and modified within the scope not departing from its gist of the present invention. For example, the color of the black area 32 is not limited to black, as long as it is a dark color which makes a clear contrast to the paper color of the document. However, the black area 32 is required to be darker than white area 46. In addition, although the automatic conveying mechanism 10 shown in FIG. 2 is structured to read images on both of the front and back surfaces with a single pass, the present invention can be applied even to an automatic conveying mechanism 10 reading an image on only a single side.

The configuration of the process unit 3 in the image forming apparatus 1 shown in FIG. 1 is not limited, and the process unit 3 in the image forming apparatus 1 shown in FIG. 1 may be a color unit or a monochrome unit, and the type of coloring material is not limited. The image forming apparatus 1 may be a reading-only machine without the main body unit 6 in FIG. 1. The scanner unit 5 of the present embodiment is capable of manual feed scanning in addition to automatic feed scanning, but the scanner unit 5 of the present embodiment may also have a configuration capable of only the automatic feed scanning. In that case, the platen glass 24 needs to have only a longitudinal portion in the width direction corresponding to the reading position.

What is claimed is:

1. An image reading apparatus for separating and conveying documents one by one from a bundle of documents, causing the document to pass through a reading position, and reading an image from the document,
the image reading apparatus comprising:
a reading translucent plate having a portion formed to be longer in a width direction than in a conveying direction of documents perpendicular to the width direction;
a rotation member capable of rotating around a shaft and provided in a width direction to face an opposing surface which is opposed to the document on the reading translucent plate; and
a rotation driver that rotates the rotation member,
wherein in the rotation member, each of:
a cleaning member that comes into contact with the opposing surface according to rotation of the rotation member;
a white reference area for obtaining white reference of the image to be read; and
an end portion detection area for detecting a width direction end portion of a document is formed partially with regard to a circumferential direction,
the cleaning member and the end portion detection area are arranged adjacent to each other without the white reference area interposed therebetween with regard to the circumferential direction of the rotation member,
the rotation driver is arranged so that the end portion detection area faces the opposing surface while the document is passing through the reading position, and
the rotation member is rotated without going through a state in which the white reference area faces the opposing surface in a paper interval period from when a trailing edge of the document passes the reading position to when a leading edge of a subsequent document reaches the reading position, so that the cleaning member is once brought into contact with the opposing surface, and then the end portion detection area returns back to a state of facing the opposing surface.

2. The image reading apparatus according to claim 1, wherein the end portion detection area has a color darker than the white reference area.

3. The image reading apparatus according to claim 1, wherein the rotation driver is capable of reversing a rotation direction.

4. The image reading apparatus according to claim 3, wherein in the paper interval period, the rotation driver rotates the rotation member, from a state in which the end portion detection area is facing the opposing surface, in a rotation direction for causing the cleaning member to come into contact with the opposing surface without going through the state in which the white reference area faces the opposing surface, and thereafter, reverses the rotation direction to cause the end portion detection area to return back to a state of facing the opposing surface.

5. The image reading apparatus according to claim 3,
wherein the rotation member is arranged with end portion detection areas at two positions adjacent to both sides of the cleaning member,
in the paper interval period, the rotation driver rotates the rotation member, from a state in which one of end portion detection areas is facing the opposing surface, to cause the cleaning member to once come into contact with the opposing surface and then to cause the other of the end portion detection area to face the opposing surface without going through a state in which the white reference area faces the opposing surface, and
the rotation direction of the rotation member is reversed for each paper interval period.

6. The image reading apparatus according to claim 1,
wherein the rotation member is arranged with at least end portion detection areas at two positions adjacent to both sides of the cleaning member, and
the rotation driver keeps any one of end portion detection areas facing the opposing surface while the document passes through the reading position, and
rotates the rotation member in a single direction from a state in which any one of the end portion detection areas faces the opposing surface to a state in which the other of end portion detection areas faces the opposing surface in a paper interval period from when the trailing edge of the document passes through the reading position to when the leading edge of a subsequent document reaches the reading position.

7. The image reading apparatus according to claim 1, comprising
a home determiner that determines a home position in the end portion detection area,
wherein, in a time other than reading an image, the home determiner obtains image data while each position in the end portion detection area is caused to face the opposing surface, and the home determiner determines that a position where image data with least dirt is obtained is a home position, and
while the document passes through the reading position, the rotation driver causes the home position to face the opposing surface.

8. The image reading apparatus according to claim 7,
wherein the rotation member is arranged with at least end portion detection areas at two positions,
the home determiner determines a home position for each end portion detection area,
when an amount of dirt of image data having least dirt in any given end portion detection area is more than a limitation amount defined in advance, the home determiner determines that the end portion detection area is unusable, and
when there is an end portion detection area that is determined to be unusable, the rotation driver does not use the end portion detection area as an end portion detection area.

9. The image reading apparatus according to claim 1, comprising
a clean mode setter that sets a clean mode for enhancing cleanliness of the opposing surface,
wherein in a case where the clean mode is set, the rotation driver brings the cleaning member into contact with the opposing surface a plurality of times in a single paper interval period.

10. An image forming apparatus comprising:
an image reading apparatus; and
an image former that forms, on an image holding medium, an image read by the image reading apparatus,
wherein the image reading apparatus is the image reading apparatus according to claim 1.

* * * * *